(12) United States Patent
Smart

(10) Patent No.: US 7,921,431 B2
(45) Date of Patent: Apr. 5, 2011

(54) N-PORT VIRTUALIZATION DRIVER-BASED APPLICATION PROGRAMMING INTERFACE AND SPLIT DRIVER IMPLEMENTATION

(75) Inventor: James Winston Smart, Costa Mesa, CA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 1385 days.

(21) Appl. No.: 11/336,032

(22) Filed: Jan. 20, 2006

(65) Prior Publication Data

US 2007/0174851 A1 Jul. 26, 2007

(51) Int. Cl.
- G06F 13/00 (2006.01)
- G06F 9/46 (2006.01)
- G06F 9/44 (2006.01)

(52) U.S. Cl. ......... 719/328; 711/114; 718/104; 719/321

(58) Field of Classification Search .................... 710/10, 710/15; 719/328, 327, 321; 711/114; 718/104
See application file for complete search history.

(56) References Cited

U.S. PATENT DOCUMENTS

| | | | |
|---|---|---|---|
| 6,209,023 B1 * | 3/2001 | Dimitroff et al. | 709/211 |
| 6,925,528 B2 * | 8/2005 | Selkirk et al. | 711/114 |
| 7,200,144 B2 * | 4/2007 | Terrell et al. | 370/389 |
| 7,366,808 B2 * | 4/2008 | Kano et al. | 710/105 |
| 7,454,605 B2 * | 11/2008 | Bayus et al. | 713/1 |
| 7,460,528 B1 * | 12/2008 | Chamdani et al. | 370/381 |
| 7,464,019 B1 * | 12/2008 | Serrano et al. | 703/25 |
| 7,516,252 B2 * | 4/2009 | Krithivas | 710/37 |
| 2004/0083285 A1 * | 4/2004 | Nicolson | 709/224 |
| 2005/0120160 A1 * | 6/2005 | Plouffe et al. | 711/1 |
| 2007/0033366 A1 * | 2/2007 | Eisenhauer et al. | 711/170 |
| 2007/0147267 A1 * | 6/2007 | Holland | 370/252 |

* cited by examiner

*Primary Examiner* — H. S. Sough
*Assistant Examiner* — Charles E Anya
(74) *Attorney, Agent, or Firm* — Morrison & Foerster LLP

(57) ABSTRACT

An API in an NPIV-compatible SAN is disclosed that includes functions for creating a vlink, replicating driver software for managing the vlink, monitoring resources in an HBA, or removing a target so that resources can be freed up for other vlinks. The API is part of a driver that communicates with a host OS and also communicates with an HBA to establish the vlinks between the host OS and FC devices. To create vlinks, an "add" function in the API is called by the OS. In addition, when a new vlink is created, a single version of an HBA interface function block is maintained in the driver, but a discovery function block, SCSI bus function block, and I/O function block are all duplicated, forming one logical vlink driver for each vlink. To obtain HBA resource information, a resource monitoring functions in the API may be called by the OS.

39 Claims, 6 Drawing Sheets

N-PORT VIRTUALIZATION DRIVER-BASED APPLICATION PROGRAMMING INTERFACE AND SPLIT DRIVER IMPLEMENTATION

FIELD OF THE INVENTION

This invention relates to N_Port ID Virtualization (NPIV) in Storage Area Networks (SANs), and more particularly, to Application Programming Interface (API) functions that allow an Operating System (OS) to monitor the resources needed by physical and virtual Fibre Channel (FC) links, create and terminate physical and virtual FC links, and replicate driver software to assist in managing the virtual links. This invention also applies to the manner in which NPIV may be implemented within an OS or device driver software.

BACKGROUND OF THE INVENTION

Conventional SANs. In a conventional FC SAN 108 shown in FIG. 1, an Input/Output Controller (IOC) or Host Bus Adapter (HBA) 100 includes a Node Port (N_Port) 102 that is connected to a FC switch or Just a Bunch Of Disks (JBOD) 104 via a FC link 106. During initialization, a known FC initialization sequence initiated by a driver 116 in a host OS 110 of host 112 causes the HBA 100 to send a Fabric Login command (FLOGI) to the switch 104, including a World-Wide Port Name (WWPN) for the N_Port 102. The switch returns a FLOGI response to the N_Port 102, including a FC address (a virtual IDentifier (ID)) associated with the WWPN for the N_Port.

The driver 116 also performs a discovery function in which it communicates with the FC switch 104 via the HBA 100 and FC link 106 and obtains a list of the addresses of all devices in the fabric. The discovery function then goes out to every address, logs into the device associated with that address (at which time a login context is allocated), and determines if the device is a FC/Small Computer System Interface (SCSI) target. If the device is a FC/SCSI target, the discovery function establishes a connection between the target and the HBA 100. In addition, the physical FC link 106 is exported as a SCSI bus 114 to the OS 110, and the remote port associated with the discovered FC/SCSI device thereafter appears as a target on the SCSI bus in typical SCSI fashion.

Conventional FC SANs 108 are limited because only one WWPN and FC address can be assigned to the N_Port 102 on a single FC link 106. In other words, this conventional computing model contemplates a single OS per system, so the OS explicitly owns the FC port. As such, system management tools have been defined (such as zoning and selective storage presentation/Logical Unit Number (LUN) masking) that are based on the FC port.

NPIV. However, FC has extended its feature set to include NPIV, a feature that allows a fabric-attached N_Port to claim multiple FC addresses. Each address appears as a unique entity on the FC fabric. Utilizing NPIV, multiple WWPNs and FC addresses recognizable by the FC switch can be assigned to a single physical FC link and N_Port. By allowing the physical FC port to now appear as multiple entities to the fabric, the conventional computing model can now be extended. A system can now run more than one OS by creating virtual systems (or machines) and running an OS image in each virtual machine. Instead of owning the physical FC port, an OS now uniquely owns one or more FC addresses (and their associated WWPNs) claimed by the FC port. As the relationship of the virtual machine/OS owning the WWPN/FC address remains consistent with the conventional computing model, legacy FC management functions can continue to be used unchanged. As the FC fabric treats each fabric entity as a unique port (including all responses to name server queries, etc), each fabric entity primarily behaves as if it were an independent FC link.

FIG. 2 illustrates a FC SAN 222 implementing NPIV. The first physical FC link 212 is generated as before, wherein an HBA 208 logs into the switch 210 by sending an FLOGI command to the switch, which then returns a FC address associated with the WWPN of the N_Port 220. Multiple additional initialization sequences are then initiated with the switch 210 by the N_Port 220 in the form of Fabric DISCovery requests (FDISCs), which are used to instantiate virtual FC links 216. A unique WWPN is provided with each FDISC to the switch 210, which returns a FDISC response with a unique virtual FC address to the HBA 208, forming a virtual FC link 216. Each virtual FC link 216 looks like a separate physical FC link 212, although all physical and virtual FC links actually share the same physical connection. With the creation of multiple virtual FC links, there appear to be multiple HBAs and ports connected to the switch 210.

FIG. 2 also illustrates a driver 204, which is part of the host OS 202 in a host 200. The driver 204 communicates with the host OS 202 over a SCSI bus 206 and communicates with hardware such as the HBA 208. The driver 204 performs the discovery function described above to establish a SCSI bus 206 associated with the physical FC link 212 and a virtual SCSI bus 218 associated with the virtual FC link 216.

Each instance of a FC link in the fabric, whether physical or virtual, will be generally referred to herein as a "vlink." In addition, the physical FC link will be referred to as the "physical vlink," and the virtual FC links will be referred to as "virtual vlinks." Each vlink has an individual and distinct representation within the FC fabric. Each vlink has its own unique identifiers (e.g. port WWPN/World-Wide Node Name (WWNN)) and its own FC address within the fabric. Each vlink is presented its own view of storage, and thus can potentially enumerate different targets and Logical Unit Numbers (LUNs) (logical storage entities). Each vlink must therefore independently register for state change notifications, and track its login state with remote ports.

NPIV has been fully adopted. See the FC-DA Technical Report (clause 4.13 N_Port_ID Virtualization) and the FC-FS Standard (clause 12.3.2.41 Discover F_Port Service Parameters (FDISC)), the contents of which are incorporated herein by reference. Note that there is no specific mention of NPIV in the FC-FS Standard, but the FDISC description has been modified to allow Address ID assignment per NPIV. See also Fibre Channel Link Services (FC-LS-2), Rev 1.2, Jun. 7, 2005, T11.org/INCITS, which describes the standard for FC link services and provides definitions for tools used for NPIV and describes N_Port requirements for virtual fabric support, and Fibre Channel Direct Attach-2 (FC-DA-2), Rev 1.00, Nov. 18, 2004, T11.org/INCITS, which describes the Standard for FC direct connect link initialization, including use of the NPIV feature, both of which are incorporated by reference herein.

Although NPIV allows the creation of many virtual vlinks along with the actual physical vlink, there is in fact only one HBA that must be shared between the physical and virtual vlinks. The resources of the HBA are finite, and different HBAs may have different levels of resources. The limitation of only one HBA places resource constraints on the system, such as the number of vlinks that may be present at any time. Several key HBA resources will now be discussed.

RPI resource. For every device that is seen on each vlink, an independent resource called a Remote Port Index (RPI) is consumed within the HBA. FIG. 3 is an illustration of the consumption of resources in an NPIV FC SAN 310. In FIG. 3, if one FC device D0 is installed on the physical vlink 312 and two FC devices D1 and D2 are installed on the virtual vlink 314, there will be a total of three RPIs consumed in the HBA 300 (see RPIs 302, 304 and 306). RPIs are context cache memory data structures which in FC may also be referred to as a login context between two ports. RPIs maintain communication state information that has been negotiated between both the local FC port on the HBA and the remote FC port on the installed FC device. Some of the data maintained in an RPI includes the addresses for both the local and remote FC ports, the class of service parameters to be used between the local and remote FC ports, and the maximum frame size. RPIs are data structures, and because there is usually a finite table of RPIs maintained in a finite HBA memory, there are a limited number of RPIs available.

XRI resource. For every SCSI I/O context that is actively occurring between the local and remote FC ports for a particular login context or RPI, another independent resource called an eXchange Resource Index (XRI) is consumed within the HBA 300. XRIs are typically bound to a particular I/O context and to an associated RPI, and store exchange IDs or exchange resources such as sequence counters, data offsets, relationships for Direct Memory Access (DMA) maps, and the like. For example, if host 316 sends a read request to FC device D1 through port P1, an XRI 320 is consumed and bound to RPI 304. As with RPIs, the XRIs are data structures stored in the finite HBA memory, and are limited in number.

To manage these resources properly, there is a need to be able to monitor the finite resources of the HBA, create and delete vlinks, and remove targets and release certain resources known to be unnecessary back into a free pool of resources so that they can be re-used by other entities. In addition, there is a need for a firmware implementation that can manage the vlinks and the finite resources of the HBA.

SUMMARY OF THE INVENTION

Embodiments of the present invention are directed to an API in an NPIV-compatible SAN that includes functions for creating a virtual vlink, replicating driver software for managing all vlinks, deleting a vlink, monitoring resources in an HBA, or removing a target so that resources can be freed up for other vlinks. The API is part of a driver that communicates with a host OS and also communicates with an HBA to establish the vlinks between the host OS and FC devices over a FC fabric. It should be understood that an API, as defined herein, includes any type of program that may be called by the host OS to perform the functions described herein. The API may be stored on storage media.

Prior to creating a new virtual vlink, the physical vlink and SCSI bus may first be created as described above with regard to non-NPIV implementations. However, in alternative embodiments, creation of the SCSI bus on the physical vlink is not required. In such an embodiment, information discovery would not necessarily be based on the SCSI bus.

After the physical vlink and SCSI bus have been created, an information gathering function in the API may be called by the host OS via the SCSI bus. This information gathering function may obtain information about whether the HBA is connected to the FC fabric, whether the fabric supports NPIV, and the maximum and available resources of the HBA (e.g for managing port-to-port logins and/or FC exchanges), including, but not limited to, the RPI and XRI resources described above. This function polls the HBA and return the desired values to the API. The host OS can then estimate how many vlinks can be created, and monitor, manage and allocate the HBA resource levels to ensure they are not overrun.

After the physical vlink has been created and resource information has been gathered, a vlink creation function in API may be called by the host OS and executed by a processor in the host to create or instantiate a virtual vlink. When the host OS calls the vlink creation function in the API, the OS indicates the HBA that the virtual vlink is to be created on, and supplies minimally the WWPN to be used for the virtual vlink to the function. The function then calls the driver, which then instantiates a new virtual SCSI bus, associates it with the new virtual vlink, and returns a context for the new SCSI bus when it returns from the vlink creation function call.

It should also be noted that after a virtual vlink is created, execution of the information gathering function described above may also return information about the virtual vlink such as the FC address/WWPN/WWNN associated with the virtual vlink, the state of the virtual vlink (active or not), and if the virtual vlink was or is inactive, the conditions that caused the virtual vlink to fail.

A delete function in the API may also be called by the OS, which cancels a virtual vlink and a virtual SCSI bus. For example, a virtual vlink can be deleted by calling a function such as lpfc_vlink_delete( ). This function will terminate the virtual vlink and disassociate itself from the FC fabric.

By default, an HBA typically consumes one RPI as soon as an installed FC device is present, and assumes that because it is present, the HBA will eventually communicate with it. The HBA consumes one RPI for each connection between the HBA and a target. Despite the establishment of vlinks between the HBA and target FC devices and the consumption of an RPI for each vlink, it may be desirable to subsequently remove a target if it will not be communicated with. To accomplish this, a target removal function such as lpfc_vlink_tgt_remove( ) can be used to request that communications with the target cease, the target be removed, and the RPI associated with the target released back to the HBA free pool so that it can be made available to other virtual vlinks and targets.

The driver in the host of a conventional SAN includes an HBA interface function block that communicates with registers in the HBA and passes data between the HBA and the host, and a discovery function block for implementing discovery operations that occur on "link up" conditions. These discovery operations obtain a FC address on the FC link, look for devices on the FC link, and perform an instantiation function by logging onto the devices. In particular, the discovery function block communicates with the FC switch via the HBA and FC link and obtains a list of all the addresses of the devices in the fabric. The discovery function block then goes out to every address, logs into the device associated with that address (at which time a login context is allocated), and determines if the device is a FC/SCSI target. If the device is a FC/SCSI target, the discovery function block creates a FC login between the FC address of the appropriate HBA port in HBA and the FC address of the remote port of the device.

Thereafter, a SCSI bus function block in the driver exports the physical FC link as a SCSI bus to an OS, and each of the remote ports associated with the discovered FC/SCSI devices thereafter appears as a target on the SCSI bus in typical SCSI fashion. The result is a logical abstraction, from the point of view of the OS, of the physical FC link and the devices connected to that link. For example, if there are a number of disk drives on the FC link, each one will look like a target to the OS.

An I/O function block also communicates with the rest of the OS to perform I/O operations. Through a normal I/O path, the OS send SCSI commands to those targets, in some cases down to the LUN level of the target.

Embodiments of the present invention are also directed to a split driver implementation for supporting NPIV. In the NPIV driver implementation, a single version of the HBA interface function block is maintained, but the discovery function block, SCSI bus function block, and I/O function block are all duplicated N times, forming N instances of a logical vlink driver, one for each vlink. Each logical vlink driver is a software instantiation that enables each vlink to interact with an OS and manages each vlink. Note that the term "software," as used herein, refers to machine code executed on a Central Processing Unit (CPU) or other processing entity. The single HBA interface function block is a multiplexing point through which all of the logical vlink drivers communicate with the FC fabric.

The discovery, SCSI bus and I/O function blocks are essentially duplicated each time a new virtual link and virtual SCSI bus are created by the API "vlink create" function described above. In the present invention, the code is ported almost verbatim from the original.

Each logical vlink driver must perform its own discovery, login to the fabric, and present its FC address as a SCSI bus to the OS with a standard I/O path relative to that bus. All of the targets in the FC fabric which are now relative to this FC address become unique targets and LUNs for that logical vlink driver. Each logical vlink driver has its own set of contexts for the SCSI bus it represents, the system, every port it sees on the FC fabric, and the state of all login negotiations between the logical vlink driver and each port it sees on the FC fabric.

The split driver implementation allows the replicated logical vlink drivers to execute either within the same OS, or as part of separate OSs. If within the same OS, the HBA interface function block and all replicated logical vlink drivers will execute as part of the same OS. The single OS will see all SCSI bus abstractions associated with the vlinks. If the vlinks are in separate OSs, one OS (designated as the primary OS) will contain the driver portion that executes the HBA interface function block. The Primary OS may also contain one or more logical vlink drivers. Simultaneously, one or more other OSs (designated as Secondary OSs) may exist which contain one or more logical vlink drivers. The SCSI bus abstraction associated with a vlink will only be known to the OS which contains the logical vlink driver for that vlink. The Primary and Secondary OS's logical vlink drivers will interact with the HBA interface function block through an inter-OS API which provides communication channels between the HBA interface function block and the logical vlink drivers.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the preferred embodiments of the present invention.

Figure 1:
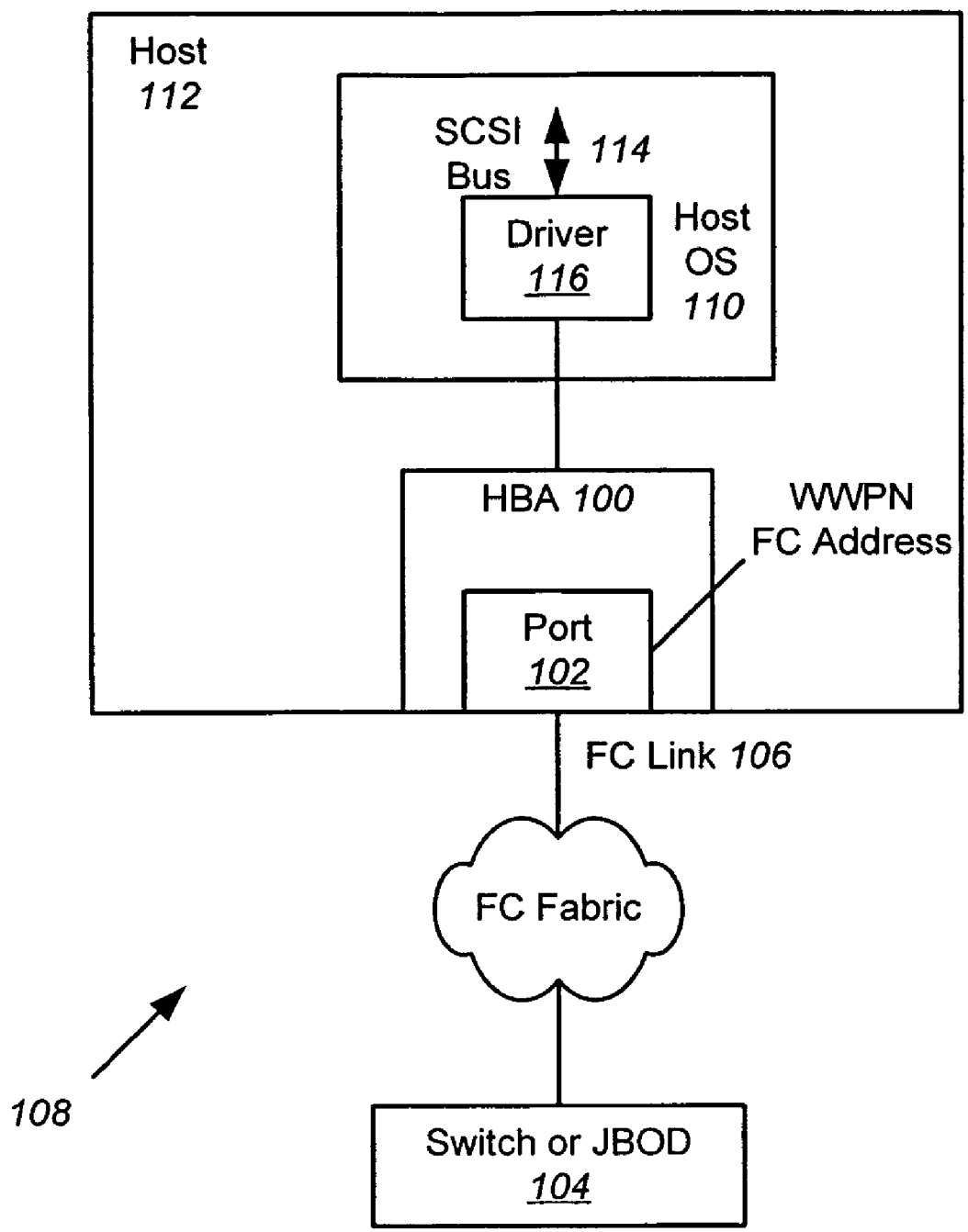
FIG. 1 is an illustration of an exemplary conventional SAN with one FC link.
Figure 2:
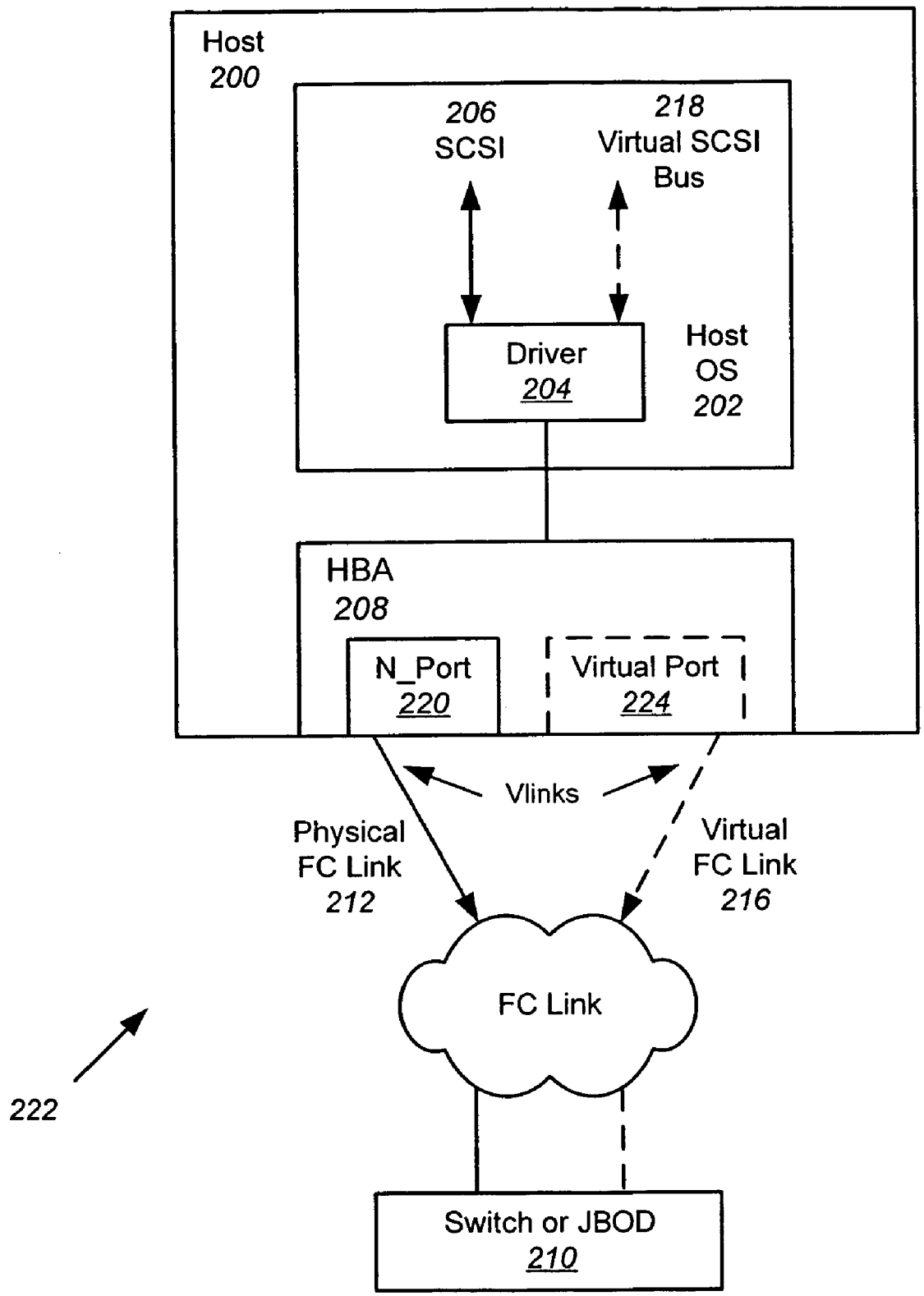
FIG. 2 is an illustration of an exemplary conventional SAN implementing NPIV and including a physical and virtual vlink.
Figure 3:
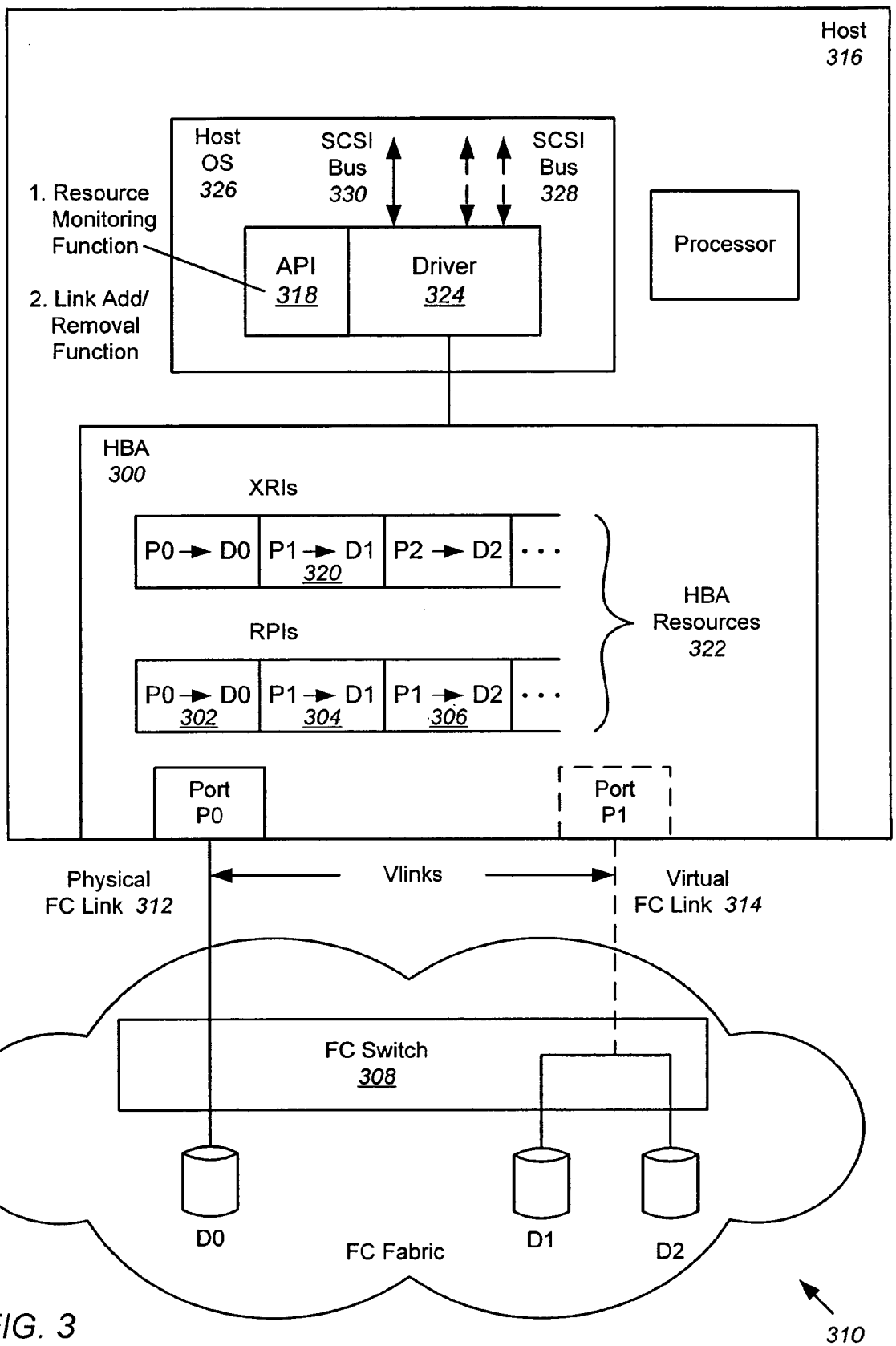
FIG. 3 is an illustration of an exemplary SAN implementing NPIV and including one physical vlink and one virtual vlink, showing some of the HBA resources that are consumed when the vlinks are established, and indicating additional resource monitoring and link creation and removal functions in an API according to embodiments of the present invention.

FIG. 3 is an illustration of an exemplary SAN 310 implementing NPIV and including one physical vlink 312 and one virtual vlink 314, showing some of the HBA resources that are consumed when vlinks are established, and indicating additional resource monitoring and link creation and removal functions in an API 318 according to embodiments of the present invention.

Prior to creating a new virtual vlink 314, the physical vlink 312 and SCSI bus 330 may first be created as described above with regard to non-NPIV implementations. However, in alternative embodiments, creation of the SCSI bus 330 on the physical vlink 312 is not required. In such an embodiment, information discovery would not necessarily be based on the SCSI bus 330.

Information gathering function. After the physical vlink 312 and SCSI bus 330 have been created, an information gathering function in the API 318 such as lpfc_vlink_getinfo( ) may be called by the host OS 326 via the SCSI bus. This information gathering function may obtain information about whether the HBA 300 is connected to the FC fabric, whether the fabric supports NPIV, and the maximum and available resources of the HBA (e.g for managing port-to-port logins and/or FC exchanges).

Note that although NPIV allows the creation of many virtual vlinks 314 along with the physical vlink 312, there is in fact only one HBA 300 that must be shared between the physical and virtual vlinks. The resources 322 of the HBA 300 are finite, and different HBAs may have different levels of resources. The limitation of only one HBA 300 places resource constraints on the system. Therefore, the information gathering function may obtain, for each monitored resource, the maximum number of resources available and usage levels (how many of those resources are in use at this time), including, but not limited to, the PRI and XRI resources described above. This function polls the HBA 300 and return the desired values to the API 318.

The host OS 326 can then estimate how many vlinks can be created, and monitor, manage and allocate the HBA resource levels to ensure they are not overrun. However, if an HBA 300 runs out of resources, any attempt to create a new virtual vlink will fail with an "out of resources" indication. For example, if HBA 300 runs out of RPIs, vlink instantiation and discovery of devices will fail and external storage will not become visible. A more common scenario, however, is that the HBA 300 may run out of vlink resources (e.g. the HBA runs out of Virtual Port Indexes (VPIs), where there is one VPI associated with each vlink. Note that a VPI's context within the HBA remembers the state of the vlink, its address, and the like.

Note that in one embodiment of the present invention, the HBA resource fields returned by the information gathering function may only be valid when the function call is made on the physical vlink 312. If a query is performed on a virtual vlink 314, invalid values will be returned.

The functionality of the information gathering function described above can be implemented in a straightforward manner using programming constructs well-understood by those skilled in the art.

vlink creation function. After the physical vlink has been created and resource information has been gathered, a vlink creation function in API 318 such as lpfc_vlink_create( ) may be called by the host OS 326 and executed by a processor in host 316 to create or instantiate a virtual vlink 314. When OS 326 calls the vlink creation function in the API 318, the OS indicates the HBA that the virtual vlink 314 is to be created on, and supplies the WWPN/WWNN to be used for the virtual vlink to the function, as may optionally provide authentication information (keys) as well. The function then calls the driver 324, which then instantiates a new virtual SCSI bus 328, associates it with the new virtual vlink 314, and returns a pointer to the new SCSI bus when it returns from the lpfc_vlink_create( ) call. The virtual vlink 314 is created by performing NPIV steps as called out by the NPIV Standards described above, and is well-understood by those skilled in the art.

The functionality of the vlink creation function described above can be implemented in a straightforward manner using programming constructs well-understood by those skilled in the art.

Note that the physical vlink 312 does not have to be up (i.e. the link is functional and ready for communications) when the vlink create function is called. If it is called while the physical vlink 312 is down (i.e. the link is not functional and not ready for communications), the driver 324 will create the virtual vlink 314 (and the virtual SCSI bus 328), but they will be considered in a virtual "link down" state. When the physical vlink 312 comes back up, the driver 324 will automatically perform the NPIV functions necessary to instantiate the virtual vlink 314 with the fabric. If the physical vlink 312 drops, or the fabric terminates the virtual vlink 314, the driver 324 will treat those as virtual "link down" conditions. The default behavior of the driver 324 upon a link down condition after a virtual vlink 314 has been instantiated with the fabric will be to not re-instantiate the virtual vlink on a subsequent physical vlink 312 link up condition. However, the driver 324 does provide an option, specified at create time, that can instruct the driver to automatically reinstate the virtual vlink 314 upon link up.

Note also that the OS 326 sees all FC links as SCSI buses, and in the example of FIG. 3 the disks or devices D0, D1 and D2 are viewed as targets on the SCSI buses associated with the virtual links. However, as the switch/fabric limits the view on the vlink, the physical vlink 312 may see only target D0, while virtual vlink 314 would see targets D1 and D2. Because each virtual vlink 314 is presented to the OS as a separate SCSI bus, it gives the OS an independent storage view seen on each vlink, and maps easily into a method where I/O is easily discriminated as to which link it is destined for. Note that although only one virtual vlink 314 and one virtual SCSI bus 328 are shown in FIG. 3, many virtual vlinks and virtual SCSI buses may be created.

Embodiments of the present invention may also be extended to include other methods of allowing a port to obtain multiple addresses and appear as independent ports to a FC fabric. Examples include the use of multiple Arbitrated Loop Physical Addresses (AL_PAs) or vSAN headers instead of NPIV.

It should also be noted that after a virtual vlink is created, execution of the information gathering function described above may also return information about the virtual vlink such as the FC address/WWPN/WWNN associated with the virtual vlink, the state of the virtual vlink (active or not), and if the virtual vlink was or is inactive, the conditions that caused the virtual vlink to fail. Note that active/not active, as used herein, is essentially interchangeable with up/down.

vlink delete function. A vlink delete function in API 318 such as lpfc_vlink_delete( ) may also be called by the OS 326, which cancels a virtual vlink 314 and a virtual SCSI bus 328. This function will terminate the virtual vlink 314 and disassociate itself from the FC fabric. The functionality of the delete function described above can be implemented in a straightforward manner using programming constructs well-understood by those skilled in the art.

API Target Removal function. Note that RPIs and XRIs are shared resources not partitioned or reserved to a particular vlink, and thus may be allocated to any of the physical and virtual vlinks as needed. Thus, it would be advantageous to be able to terminate unused vlinks and free up RPIs and XRIs that are not needed so that they can be available for other vlinks.

By default, an HBA typically consumes one RPI as soon as an installed FC device is present, and assumes that because it is present, the HBA will eventually communicate with it. As noted above, FIG. 3 illustrates an example SAN 310 in which HBA 300 is connected to targets D0, D1 and D2 through a FC switch 308. The HBA 300 has a physical port P0 and a virtual port P1 with corresponding FC addresses FCA0 and FCA1, respectively. The HBA 300 consumes one RPI for each connection between the HBA and a target. In the example of FIG. 3, an RPI 302 is consumed for the physical vlink from port P0 to device D0, an RPI 304 is consumed for the virtual vlink from port P1 to device D1, and an RPI 306 is consumed for the virtual vlink from port P1 to device D2. However, there is an overall limit on the number of vlinks, as established by the RPI limits and other resource limits.

Despite the establishment of vlinks between the HBA and fabric and the consumption of an RPI for each vlink, it may be desirable to subsequently remove a target. For example, in FIG. 3 it may be determined at some point in time that no I/O requests will be made to target device D2, or that target D2 should be removed so that no further I/O requests can be made to that target. In such a scenario, it would be advantageous to remove the target and release the RPI resource associated with that target back to a free pool maintained by the system so that it is available for other targets that may be discovered on other vlinks.

To accomplish this, a target removal function such as lpfc_vlink_tgt_remove( ) can be used according to embodiments of the present invention to request that communications with the target cease, the target be removed, and the RPI associated with the target released back to the system free pool so that it can be made available to other virtual vlinks and targets. The functionality of the target removal function described above can be implemented in a straightforward manner using programming constructs well-understood by those skilled in the art.

In general, the XRI resources are managed by the API 318 based on received I/O requests and the subsequent establishment of an I/O context. In contrast to RPIs, XRIs are short-lived, and are consumed and released as I/O contexts are established and torn down. In the example of FIG. 3, if a host issues a read request to FC device D2 through port P1 of HBA 300, an I/O context is established, and an XRI resource 320 is consumed. The XRI 320 is temporarily bound to the RPI 306 associated with the connection between port P1 and FC device D2 while the connection is functioning, and may be considered a sub-element of the RPI. Because XRIs are only needed during the processing of an I/O request, are allocated by the API 318 based on generating an I/O request, and are torn down when the I/O request is completed, there is less of a need for a removal function call to tear down an I/O context, although such a function call does exist. Note that is most OSs, there is an "abort I/O" function that is part of the OS to driver interfaces associated with the SCSI bus. To avoid over-consuming XRI resources, the API 318 only need know how many XRIs are available, and how many are currently in use. If an I/O request is received but no more XRIs are available, the HBA 300 recognizes this and kicks the I/O request back to the host with an error response.

Figure 4:
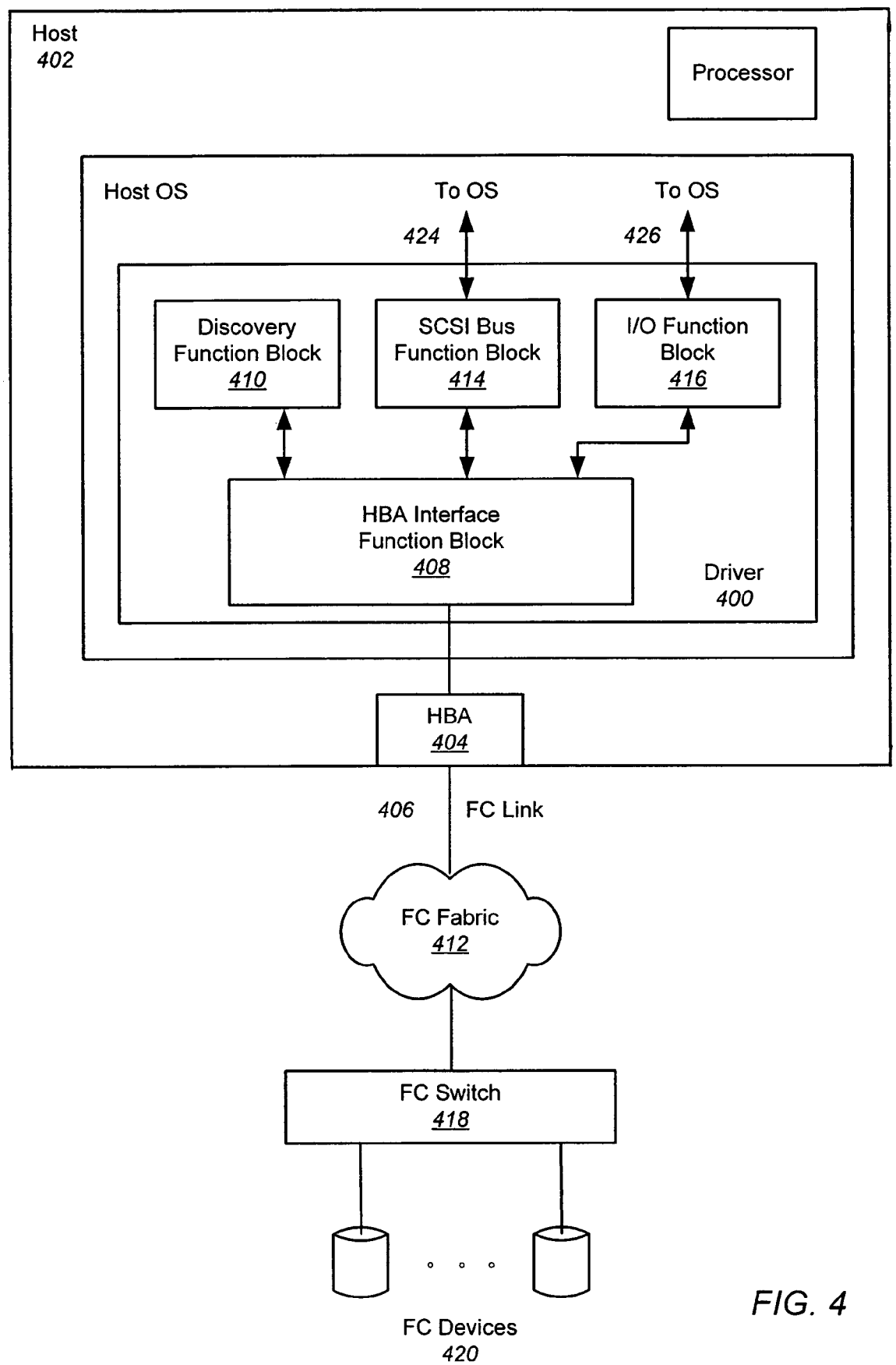
FIG. 4 illustrates an example of a conventional SAN with driver software including multiple function blocks within a host.

Split driver code for vlinks. FIG. 4 illustrates an example of a conventional SAN with a driver 400 in a host OS, which is executed by a processor within a host 402. The driver 400 communicates with hardware such as an HBA 404, which communicates over a FC link 406 in a FC fabric 412 containing a FC switch 418 and devices 420 in the SAN. The driver 400 includes an HBA interface function block 408 that communicates with registers in the HBA 404 and passes data between the HBA and the host 402. The driver 400 also includes a discovery function block 410 for implementing discovery operations that occur on "link up" or "remote state change" conditions. These discovery operations look for devices on the FC link, determines if they are FC/SCSI devices, and establishes a connection between the devices and the HBA, as described above.

In particular, the discovery function block 410 communicates with the FC switch 418 via the HBA 404 and FC link 406 and obtains a list of all the addresses of the devices 420 in the fabric. The discovery function block 410 then goes out to every address, logs into the device 420 associated with that address (at which time a login context is allocated), and determines if the device is a FC/SCSI target. If the device is a FC/SCSI target, the discovery function block creates a FC login between the FC address of the appropriate HBA port in HBA 404 and the FC address of the remote port of the device.

Thereafter, a SCSI bus function block 414 exports the physical FC link 406 (or any other vlink) as a SCSI bus to the OS as soon as the vlink is created, and each of the remote ports associated with the discovered FC/SCSI devices appears as a target on the SCSI bus in typical SCSI fashion. The result is a logical abstraction, from the point of view of the OS, of the physical FC link 406 and the devices 420 connected to that link. For example, if there are a number of disk drives on the FC link 406, each one will look like a target to the OS.

An I/O function block 416 also communicates with the rest of the OS to perform I/O operations. Through a normal I/O path, the OS send SCSI commands to those targets, or may request the abort of a previous command issued to one of the targets.

Note that the system of FIG. 4 is based on the assumption that there is always a single relationship between the SCSI bus that the OS sees and the FC link 406. Because this single relationship is assumed, monolithic design choices are made in the creation of data structures, function groupings, and the state maintained in the driver for the discovery function block 410.

Figure 5:
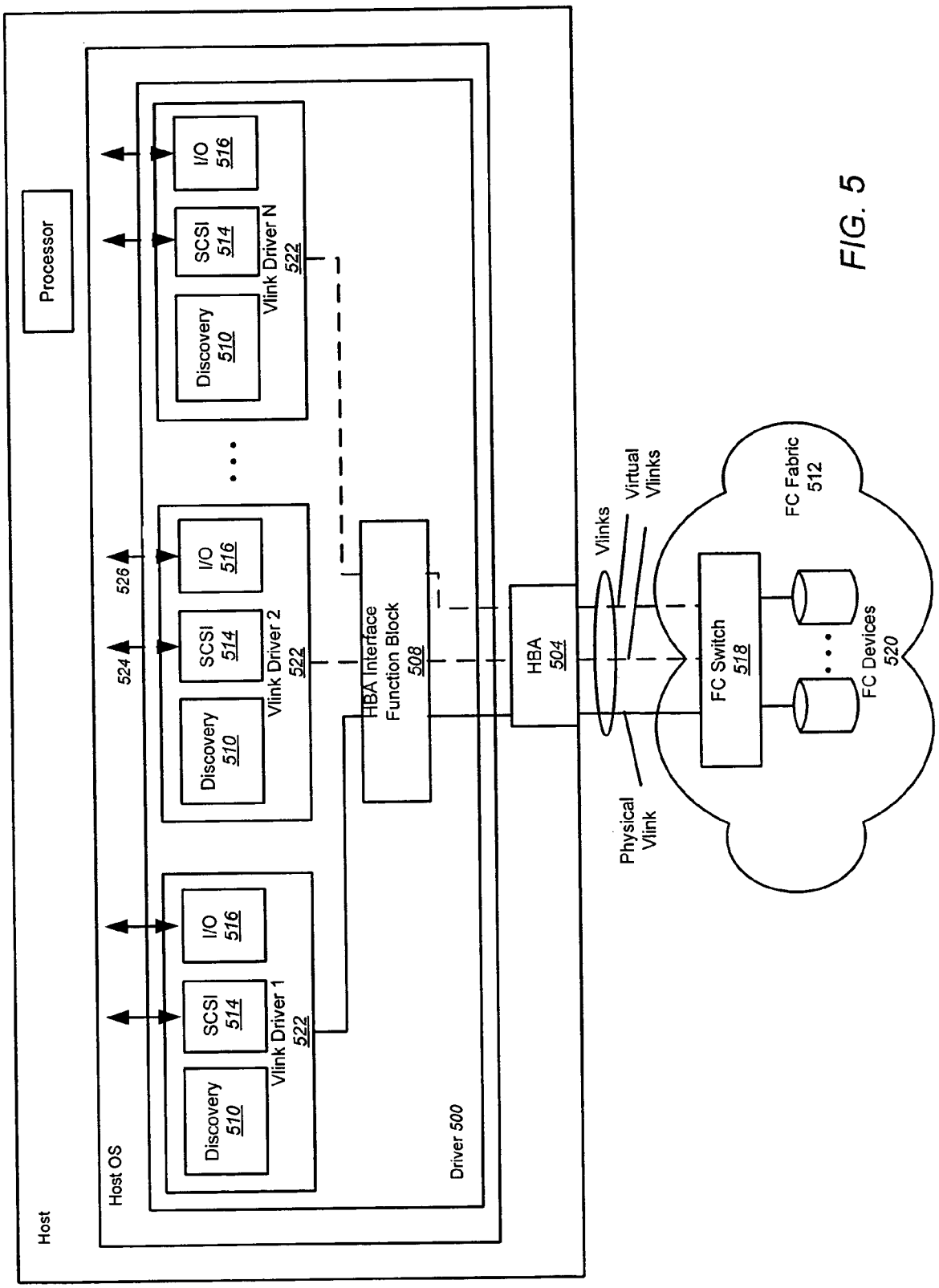
FIG. 5 is an illustration of an exemplary split driver implementation of the driver software for supporting NPIV under a single OS according to embodiments of the present invention.

FIG. 5 is an illustration of an exemplary split driver implementation of the driver software 500 for supporting NPIV according to embodiments of the present invention. In the NPIV implementation of FIG. 5, on a system in which a single Host OS is running on a Host, a single version of the HBA interface function block 508 is maintained, but the discovery function block 510, SCSI bus function block 514, and I/O function block 516 are all duplicated N times, forming N instances of logical vlink driver 522, one for each vlink. Each logical vlink driver 522 is a software instantiation that, when executed by a processor in the host, enables each vlink to interact with the OS and manages each vlink. Note that although the API containing the resource monitoring and link creation and removal functions described above is not shown in FIG. 5, it should be understood that a separate instantiation of this API may be associated with each of the vlink drivers. The single HBA interface function block 508 is a multiplexing point through which all of the logical vlink drivers 522 communicate with the FC fabric.

The discovery, SCSI bus and I/O function blocks 510, 514 and 516 are essentially duplicated each time a new virtual link 502 and virtual SCSI bus 504 are created by the vlink create function described above. In the present invention, the code is ported almost verbatim from the original. The functionality of the software duplication function described above can be implemented in a straightforward manner using programming constructs well-understood by those skilled in the art.

As described above, each time a new vlink is created, a unique FC address is associated with a unique WWPN/WWNN, and thus each logical vlink driver 522, when created, is associated with a unique FC address/WWPN/WWNN. The allocation of finite HBA resources as described above occurs globally as each logical vlink driver 522 is created and executes.

Each logical vlink driver 522 must perform its own discovery, login to the fabric, and present its FC address as a SCSI bus 524 to the OS with a standard I/O path 526 relative to that bus, as described above. All of the targets 520 in the FC fabric which are now seen in the fabric relative to this FC address become unique targets and LUNs for that logical vlink driver 522. Each logical vlink driver 522 has its own set of contexts for the SCSI bus it represents, the system, every port it sees on the FC fabric, and the state of all login negotiations between the logical vlink driver and each port it sees on the FC fabric.

Note that there must always be at least one logical vlink driver 522 that maps or binds to the original physical FC link, and has a slightly different initialization with the fabric as compared to subsequent instantiations of vlinks (i.e. F_Port FLOGI instead of an FDISC as described above). In addition, if the first instance of the logical vlink driver 522 (representing the physical vlink) terminates, it results in the termination of all virtual vlinks. The vlinks may stay instantiated with respect to the OS, but as soon as communications with the FC fabric are restored, the physical vlink relationship must be established first, and then other virtual vlinks can be created after that.

Figure 6:
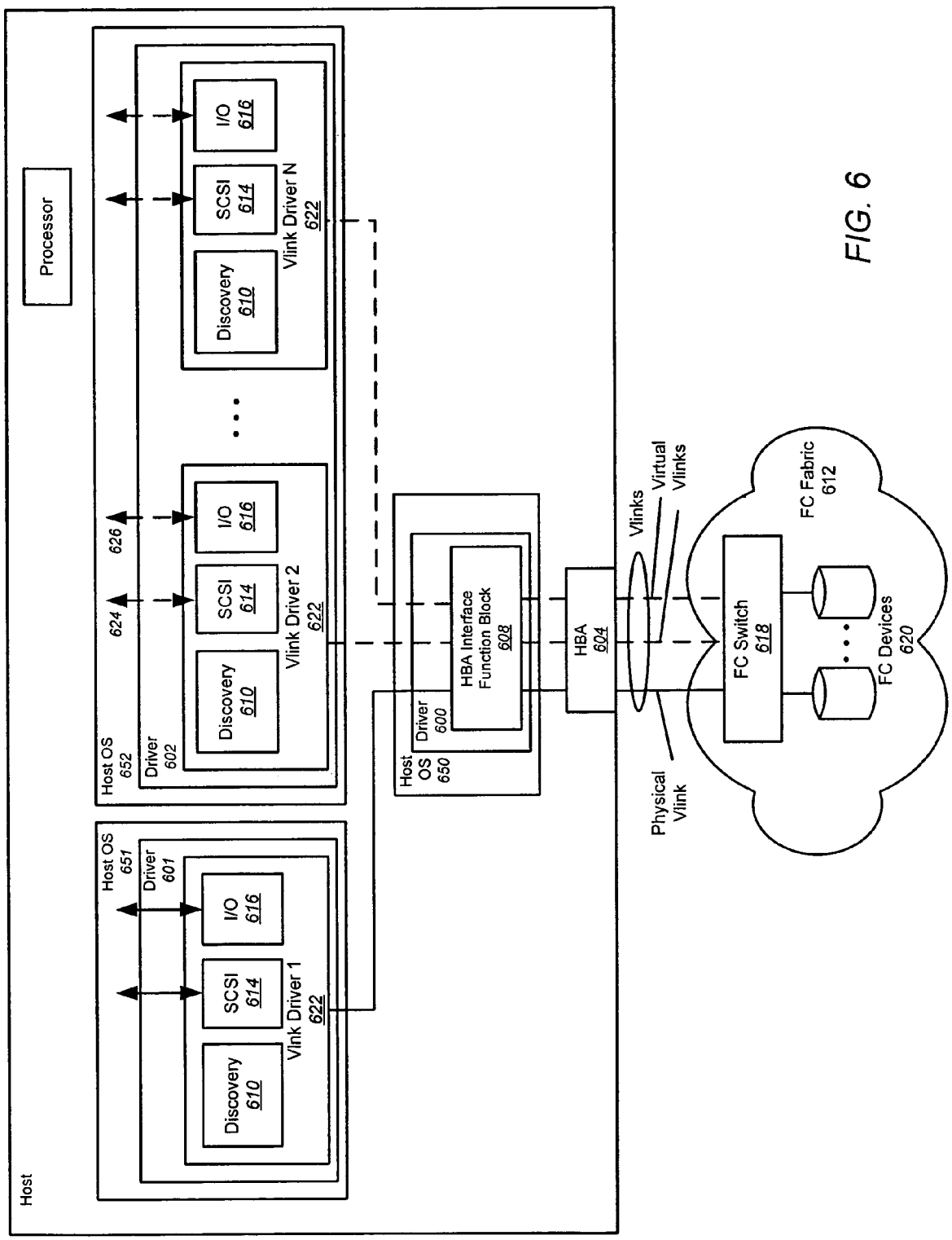
FIG. 6 is an illustration of an exemplary split driver implementation of the driver software for supporting NPIV under multiple OSs according to embodiments of the present invention.

FIG. 6 is a second illustration of an exemplary split driver implementation of the driver software for supporting NPIV according to embodiments of the present invention. In the NPIV implementation of FIG. 6, on the system in which multiple Host OSs are running on a single Host, a single version of the HBA interface function block 608 is maintained, but the discovery function block 610, SCSI bus function block 614, and I/O function block 616 are all duplicated N times, forming N instances of logical vlink driver 622, one for each vlink. One Host OS contains a driver which contains the HBA interface function block 608 and zero or more instances of the logical vlink driver 622. Other Hosts OSs running on the host contain a driver which contains one or more instances of the logical vlink driver 622. In FIG. 6, Host OS 650 contains driver 600, which contains HBA Interface block 608 and zero instances of vlink driver 522. Host OS 651 contains driver 601, which contains a single instance of logical vlink driver 622. Host OS 652 contains driver 602, which contains 1 . . . N instances of logical vlink driver 622. Each logical vlink driver 622 is a software instantiation that, when executed by a processor in the host, enables each vlink to interact with its respective OS and manages each vlink. The single HBA interface function block 608 is a multiplexing point through which all of the logical vlink drivers 622 communicate with the FC fabric.

Logical vlink drivers. The following paragraphs, although referencing the embodiment of FIG. 5 for purposes of explanation only, are equally applicable to the embodiment of FIG. 6. Each logical vlink driver 522 contains functionality for communicating over a vlink once connectivity has been established with the FC fabric (i.e. after the logical vlink driver 522 has logged in to the FC fabric via FLOGI or FDISC to a Fabric Port (F_Port) on a switch), and the logical vlink driver 522 has received back a FC address to use for further vlink communication. At this point, each logical vlink driver 522 is largely indistinguishable from another. However, subsequent traffic sent using the FC address determines the port role (e.g. an FCP Initiator (typical for an HBA), FCP Target, IP/FC interface, FICON, etc.). The FLOGI/FDISC difference described above is the only significant distinction between a physical vlink and a virtual vlink. There are a few other distinctions, such as a management application may only be able to reset the HBA or download firmware through the SCSI bus associated with the physical vlink. If this functionality was tried with a virtual vlink, it might be rejected.

HBA Interface function block. The common HBA interface function block 508 is tailored to the HBA 504 and physical vlink. All of the functions for the HBA 504 are located here, such as the function of connecting the HBA into the OS (i.e., a Peripheral Component Interconnect (PCI) bus attachment interface to load the driver for the HBA into the OS). The HBA interface function block 508 also includes functions which may include, but are not limited to, initializing and communicating with the HBA's read/write registers, handling interrupts, and communicating with message passing mechanisms in the HBA 504 for sending requests and receiving responses. The HBA interface function block 508 also performs a few native functions for the management of the physical FC link, including enabling basic transmission/reception or turning on the optics for the port.

Once these physical functions are performed, the HBA interface function block 508 typically initiates the first step of NPIV, which is establishing one logical vlink driver 522 to perform FLOGI initialization with the F_Port and become active on the FC link under the control of either the "add" function described above, or more likely an internal "add" function that performs much the same functions. The physical vlink is responsible for determining whether NPIV is supported, and whether there will ever be another virtual vlink present on the fabric. To determine this, the HBA interface function block 508 performs the function of detecting whether the HBA 504 is of a type (i.e. has the necessary firmware) to support multiple vlinks. The created physical vlink, which performed the first FLOGI, determines whether the switch 518 supports NPIV.

Additional HBA interface function block 508 functions may include HBA 504 and physical vlink management, including the management of HBA information such as serial number, firmware version, Read Only Memory (ROM) version, HBA model, etc. HBA interface function block 508 functions may also include the management of PCI information such as what PCI slot the HBA is located in, what handlers the OS gives to access registers on the HBA, what handlers the OS gives when doing DMA setup for the HBA, registering the interrupt handler with the OS, and other basic hardware interactions.

The HBA interface function block 508 has functionality in its code to allow physical interaction with the HBA 504 via the system's I/O bus such as initialization of the HBA, management of hardware errors, and the sending and receiving of commands to/from the HBA. Other functionality may include physical vlink information management such as whether the vlink is on or off (has transmission been enabled or disabled), topology type (AL or point-to-point), vlink speed (e.g. 2, 4, 8, or 10 GBit), and vlink timeout values. Other physical vlink information managed by the HBA interface function block 508 may include global statistics for all vlinks such as low level link primitive counts, frame transmit and receive counts, etc, capabilities such as whether or not NPIV is supported, and NPIV resources (e.g. maximum amount, amount in use).

The HBA interface function block 508 may also provide hooks to the logical vlink drivers 522 for passing information to the logical vlink drivers 522. The HBA interface function block 508 includes software to determine which vlink is serving in the "physical vlink" role, and to pass this information along with information related to whether the HBA can support NPIV. The HBA interface function block 508 interacts with the physical vlink to pass physical WWPN values, and to determine when the physical vlink has actually completed its first interaction with the fabric in the form of an FLOGI command, whether NPIV is supported by the fabric and the HBA, and the native address that the physical vlink obtained. The HBA interface function block 508 also maintains a list of vlinks active on HBA.

Logical vlink drivers—Discovery function block. The discovery function block 510 in each logical vlink driver 522 performs initialization with the fabric and obtains a FC Address. If the logical vlink driver 522 is representing a physical vlink, then FLOGI is used. If the logical vlink driver 522 is representing a virtual vlink, then FDISC is used. Once the FC address for the vlink is obtained, the discovery function block 510 can send any sequence of requests out over the vlinks, and they will be treated as separate, unique entities. Viewed from the outside the host/HBA, each vlink is viewed as a separate logical FC port with a separate conventional HBA, because the fabric views them according to their FC address/WWPN/WWNN.

Another critical role of the discovery function blocks 510 is the discovery of, and port login with, remote ports. The FC fabric 512 is managed by the WWPN/WWNN, and remote ports maintain a unique state relative to each FC Address/WWPN/WWNN. Because the remote port (e.g a FC disk array) sees each vlink as a unique FC address/WWPN/WWNN, the remote port tracks logins to each vlink on a unique basis. Therefore, within each vlink, a completely independent view of what is present on the fabric is provided, even though all vlinks are sharing the same physical FC link. For example, with zoning, the switch can be configured such that every time it sees a certain WWPN, it only presents remote ports A, B and C to it, although D, E and F may also exist on the fabric. Because each vlink is associated with a unique FC address and WWPN, each vlink interacts with fabric services as a unique entity from the fabric's perspective, whether registering for RSCN events or requesting a download of the name server, directory server, management server contents, and the like. Each discovery function block 510 also performs and maintains port-to-port logins (e.g. local logical FC port to remote port), which are the RPIs referred to above.

The discovery function blocks 510 also perform the function of providing hooks to the physical FC link (the HBA interface function block 508). Each discovery function block 510 communicates in a consistent fashion with the HBA interface function block 508 to send requests to the HBA 504 to send commands (e.g. SCSI read commands), receive responses, receive notification of interrupts pertaining to the vlink, and the like. These requests are implemented by code in the discovery function blocks 510 that communicates with a routine in the HBA interface function block 508 that takes care of submitting the request to the HBA and getting back a response.

The discovery function block 510 in the logical vlink driver 522 that supports the physical vlink includes some special roles. One of these special roles is to perform fabric initialization via FLOGI, obtain a FC address, and determine if the fabric supports NPIV. After initialization of the physical vlink is completed using FLOGI, if the fabric and HBA were determined to support NPIV, the other virtual vlinks can be initialized using FDISC. Note that if the physical vlink drops for any reason, the other virtual vlinks are immediately inactivated. However, if the physical vlink comes back (e.g. a cable is plugged back in), then after an FLOGI is performed all the other virtual vlinks are immediately instantiated or restarted again. The discovery function block 510 in the logical vlink driver 522 that supports the physical vlink is also a conduit to user-space applications that may want to manipulate the HBA 503 (e.g. update firmware, etc). The discovery function block 510 in the logical vlink driver 522 that supports the physical vlink also tracks how many NPIV resources exist in the HBA, and how many are in use as reported by the switch.

The discovery function blocks 510 that support the virtual vlinks also include some special roles, including performing fabric initialization via FDISC.

The discovery function blocks 510 also track and maintain vlink information such as whether the vlink is in an active or inactive state. An inactive state may occur if a cable is unplugged, a switch ran out of resources and denied an initialization, or the HBA ran out of resources and denied its initialization, etc. Each discovery function block 510 also tracks and maintains statistics such as frame transmit and receive counts of traffic specific to the FC address/WWPN/WWNN) of the vlink (as compared to the previously described physical vlink statistics, which can be an aggregate of all the vlinks).

Logical vlink drivers—SCSI function block. In addition to providing hooks to the physical FC link (the HBA interface function block 508), each logical vlink driver 522 also contains a SCSI function block 514 that includes code to register its corresponding vlink with the OS, and present the vlink to the OS in a style that the OS expects. Typically, the HBA 504 is an FCP initiator and the OS includes a SCSI subsystem, so the SCSI function block 514 will register with the SCSI subsystem as a SCSI bus, and present targets and possibly LUNs to the SCSI subsystem so that SCSI I/O operations and the like can be performed. If the HBA 504 is for communicating IP/FC, the SCSI function block 514 could register with the networking stack as an IP Network Interface Card (NIC). The SCSI function block 514 also contains code to send receive requests and responses from the OS relative to the vlink (e.g. send/receive SCSI commands, IP packets, etc.).

Logical vlink drivers—I/O block. The I/O block 516 of each logical vlink driver 522 can call on software for "SCSI Bus" functionality when the HBA is a FCP initiator. This includes interaction with the SCSI bus data structures of the OS to report remote ports found on the vlink and whether they were FC targets, and present them as targets with target IDs. The I/O block 516 can also maintain bindings such that the FCP target is always presented with the same target ID on the SCSI bus presented to the OS. In addition, in some OSs, the I/O block 516 can also discover and present SCSI LUNs for the LUNs present on each FC target. Note that if the SCSI block 514 supports IP/FC, then the I/O described here could be the sending/reception of network packets, and the particular mode of the firmware in the HBA that supports IP/FC may be selected.

The I/O block 516 can also perform functions such as receiving commands from the OS to send to a target or LUN, sending and receiving I/O requests, queuing I/O requests if the HBA 504 is busy, performing target or LUN round-robin or load-balancing when sending commands to the HBA, performing queue depth management in response to QUEUE_FULL responses from the HBA, tracking I/O timeouts, performing I/O request aborts and/or retries, and performing various types of resets (e.g. LUN resets, target resets, and bus level resets) and task management functions.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A non-transitory storage medium storing an Application Programming Interface (API), the API including one or more functions which, when installed in a host computer executing at least one host Operating System (OS) and driver software and coupled to a Host Bus Adapter (HBA), and when called by the host OS and executed by a processor in the host computer, causes the processor to perform the steps of:
   determining if the HBA is coupled to a Fibre Channel (FC) fabric;
   determining if the fabric supports N_Port ID Virtualization (NPIV);
   instantiating a FC link (vlink) if the HBA is coupled to the FC fabric and the FC fabric supports NPIV; and
   in response to the instantiation of the vlink, replicating selected driver software to provide replicated driver software for managing the instantiated vlink and enabling the vlink to interact with the host OS, the replicated driver software forming a logical vlink driver for the instantiated vlink, wherein both the selected driver software and the replicated driver software are in shared communication with the HBA.

2. The non-transitory storage medium as recited in claim 1, wherein the driver software includes a HBA interface function block, a discovery function block, a Small Computer System Interconnect (SCSI) bus function block, and an Input/Output (I/O) function block, and the selected driver software comprises the discovery function block, the SCSI bus function block, and the I/O function block.

3. The non-transitory storage medium as recited in claim 1, wherein at least one of the functions, when called, further causes the processor to perform the step of gathering information about the maximum and available resources of the HBA.

4. The non-transitory storage medium as recited in claim 3, wherein at least one of the functions, when called, further causes the processor to perform the step of gathering information about the maximum and available Report Port Index (RPI) resources of the HBA.

5. The non-transitory storage medium as recited in claim 3, wherein at least one of the functions, when called, further causes the processor to perform the step of gathering information about the maximum and available eXchange Resource Index (XRI) resources of the HBA.

6. The non-transitory storage medium as recited in claim 1, wherein the step of instantiating a vlink comprises:
receiving information about the HBA that the vlink is to be created on, and a World-Wide Port Name (WWPN) to be associated with the vlink;
calling the driver software to instantiate a virtual Small Computer System Interconnect (SCSI) bus;
associating the virtual SCSI bus with the vlink; and
returning a pointer to the virtual SCSI bus.

7. The non-transitory storage medium as recited in claim 1, wherein at least one of the functions, when called, further causes the processor to perform the step of gathering information about one or more of:
a FC address and a World-Wide Port Name (WWPN) to be associated with the vlink; an active or inactive state of the vlink; and
if the vlink is or was inactive, a cause of the failure.

8. The non-transitory storage medium as recited in claim 1, wherein at least one of the functions, when called, further causes the processor to perform the step of deleting a vlink.

9. The non-transitory storage medium as recited in claim 1, wherein at least one of the functions, when called, further causes the processor to perform the step of removing a target.

10. The non-transitory storage medium as recited in claim 9, wherein the step of removing a target comprises:
initiating the cessation of communications with the target;
removing the target from the instantiated vlink; and
releasing an Report Port Index (RPI) resource so that it can be made available to other vlinks.

11. The non-transitory storage medium as recited in claim 2, wherein the HBA interface function block communicates with registers in the HBA and passes data between the HBA and the host OS.

12. The non-transitory storage medium as recited in claim 2, wherein the discovery function block performs discovery operations comprising:
locating devices on the vlink;
determining if the located devices are FC/SCSI devices; and
establishing a connection between the devices and the HBA.

13. The non-transitory storage medium as recited in claim 2, wherein the SCSI bus function block exports the vlink as a SCSI bus to the OS.

14. The non-transitory storage medium as recited in claim 2, wherein each logical vlink driver causes the processor to perform the steps of:
discovering FC targets on the vlink;
logging into the FC fabric; and
presenting a FC address associated with the vlink as a SCSI bus to the OS.

15. The non-transitory storage medium as recited in claim 2, when called by the host OS and executed by the processor in the host computer, causes the processor to perform the step of replicating the selected driver software within a single host OS.

16. The non-transitory storage medium as recited in claim 2, when called by the host OS and executed by the processor in the host computer, causes the processor to perform the step of replicating the selected driver software within multiple host OSs.

17. The non-transitory storage medium as recited in claim 16, wherein the HBA interface function block is located in a host OS that is different from the multiple host OSs containing the replicated selected driver software.

18. A Storage Area Network (SAN) comprising at least one host computer having the API of claim 1 installed within.

19. In a host computer executing at least one host Operating System (OS) and driver software and coupled to a Host Bus Adapter (HBA), a method comprising:
determining if the HBA is coupled to a Fibre Channel (FC) fabric;
determining if the HBA supports N_Port ID Virtualization (NPIV);
instantiating a FC link (vlink) if the HBA supports NPIV; and
in response to the instantiation of the vlink, replicating selected driver software to provide replicated driver software for managing the instantiated vlink and enabling the vlink to interact with the host OS, the replicated driver software forming a logical vlink driver for the instantiated vlink, wherein both the selected driver software and the replicated driver software are in shared communication with the HBA.

20. The method as recited in claim 19, wherein the driver software includes a HBA interface function block, a discovery function block, a Small Computer System Interconnect (SCSI) bus function block, and an Input/Output (I/O) function block, and the step of replicating selected driver software comprises replicating the discovery function block, the SCSI bus function block, and the I/O function block.

21. The method as recited in claim 19, further comprising gathering information about the maximum and available resources of the HBA.

22. The method as recited in claim 21, further comprising gathering information about the maximum and available Report Port Index (RPI) resources of the HBA.

23. The method as recited in claim 21, further comprising gathering information about the maximum and available eXchange Resource Index (XRI) resources of the HBA.

24. The method as recited in claim 19, the step of instantiating a vlink comprising:
receiving information about the HBA that the vlink is to be created on, and a World-Wide Port Name (WWPN) to be associated with the vlink;
calling the driver software to instantiate a virtual Small Computer System Interconnect (SCSI) bus;
associating the virtual SCSI bus with the vlink; and
returning a pointer to the virtual SCSI bus.

25. The method as recited in claim 19, further comprising gathering information about one or more of:
a FC address and a World-Wide Port Name (WWPN) to be associated with the vlink;
an active or inactive state of the vlink; and
if the vlink is or was inactive, a cause of the failure.

26. The method as recited in claim 19, further comprising the step of deleting a vlink.

27. The method as recited in claim 19, further comprising the step of removing a target.

28. The method as recited in claim 27, the step of removing a target comprising:
initiating the cessation of communications with the target;
removing the target from the instantiated vlink; and
releasing an Report Port Index (RPI) resource so that it can be made available to other vlinks.

29. The method as recited in claim 20, further comprising performing HBA interface operations for each logical vlink driver by communicating with registers in the HBA and passing data between the HBA and the host OS.

30. The method as recited in claim 20, further comprising performing discovery operations for the instantiated vlink by:
   locating devices on the vlink;
   determining if the located devices are FC/SCSI devices; and
   establishing a connection between the devices and the HBA.

31. The method as recited in claim 20, further comprising performing SCSI bus operations for the instantiated vlink by exporting the vlink as a SCSI bus to the OS.

32. The method as recited in claim 20, further comprising executing each logical vlink driver to perform the steps of:
   discovering FC targets on the vlink;
   logging into the FC fabric; and
   presenting a FC address associated with the vlink as a SCSI bus to the OS.

33. The method as recited in claim 20, further comprising replicating the selected driver software within a single host OS.

34. The method as recited in claim 20, further comprising replicating the selected driver software within multiple host OSs.

35. The method as recited in claim 34, further comprising locating the HBA interface function block in a host OS that is different from the multiple host OSs containing the replicated selected driver software.

36. A non-transitory storage medium storing an Application Programming Interface (API), the API including one or more functions which, when installed in a host computer executing at least one host Operating System (OS) and driver software and coupled to a Host Bus Adapter (HBA), and when called by the host OS and executed by a processor in the host computer, causes the processor to perform the steps of:
   determining if the HBA is coupled to a Fibre Channel (FC) fabric;
   determining if the fabric supports N_Port ID Virtualization (NPIV); and
   gathering information about the maximum and available resources of the HBA, including a Report Port Index (RPI) resource;
   determining how many FC links (vlinks) can be created between the HBA and one or more targets connected thereto based on the gathered information;
   instantiating a vlink for a target of the one or more targets and allocating at least one RPI resource for the target initiating the cessation of communications with the target;
   removing the target from the vlink; and
   releasing the RPI resource so that it can be made available to other vlinks.

37. The non-transitory storage medium as recited in claim 36, wherein at least one of the functions, if called, further causes the processor to perform the step of gathering information about the maximum and available eXchange Resource Index (XRI) resources of the HBA.

38. In a host computer executing at least one host Operating System (OS) and driver software and coupled to a Host Bus Adapter (HBA), a method comprising:
   determining if the HBA is coupled to a Fibre Channel (FC) fabric;
   determining if the fabric supports N_Port ID Virtualization (NPIV); and
   gathering information about the maximum and available resources of the HBA, including a Report Port Index (RPI) resource;
   determining how many FC links (vlinks) can be created between the HBA and one or more targets connected thereto based on the gathered information;
   instantiating a vlink for a target of the one or more targets and allocating at least one RPI resource for the initiating the cessation of communications with the target;
   removing the target from the vlink; and
   releasing the RPI resource so that it can be made available to other vlinks.

39. The method as recited in claim 38, further comprising gathering information about the maximum and available eXchange Resource Index (XRI) resources of the HBA.

* * * * *